(12) United States Patent
Pryor et al.

(10) Patent No.: US 7,487,353 B2
(45) Date of Patent: Feb. 3, 2009

(54) SYSTEM, METHOD AND PROGRAM FOR PROTECTING COMMUNICATION

(75) Inventors: Robert Franklin Pryor, Lynn Haven, FL (US); Marc Lawrence Steinbrecher, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 716 days.

(21) Appl. No.: 10/850,997

(22) Filed: May 20, 2004

(65) Prior Publication Data

US 2005/0273592 A1   Dec. 8, 2005

(51) Int. Cl.
*H04L 9/12* (2006.01)

(52) U.S. Cl. .......................... 713/170; 713/168; 726/3; 726/7

(58) Field of Classification Search ................. 713/169, 713/201, 168, 170; 726/3, 7
See application file for complete search history.

(56) References Cited

U.S. PATENT DOCUMENTS 5,694,569 A    12/1997  Fischer
6,058,399 A *  5/2000   Morag et al. ................. 707/201
6,393,438 B1   5/2002   Kathrow et al. ............. 707/203
6,449,613 B1   9/2002   Egolf et al. ..................... 707/7
2002/0104022 A1* 8/2002 Jorgenson ................... 713/201
2003/0028768 A1* 2/2003 Leon et al. .................. 713/169

* cited by examiner

*Primary Examiner*—KimYen Vu
*Assistant Examiner*—Edward Zee
(74) *Attorney, Agent, or Firm*—Christopher & Weisberg, P.A.

(57) ABSTRACT

A method for transferring data between a first computer and a second computer is provided. The first computer sends a request to start a session, an encrypted session ID, and an encrypted hash value to the second computer. The second computer receives the request, decrypts the encrypted hash value, independently determines a hash value and compares the independently determined value to the decrypted value. If they match, the second computer starts a session with the first computer. Subsequently, the first computer sends a request to download or upload data, an encrypted ID, an identity of the file, and an encrypted hash value to the second computer in a second connection in the session. The second computer receives the request, decrypts the encrypted hash value, independently determines a hash value and compares the independently determined value to the decrypted value. If they match, the second computer processes the request.

20 Claims, 4 Drawing Sheets

SYSTEM, METHOD AND PROGRAM FOR PROTECTING COMMUNICATION

BACKGROUND OF THE INVENTION

The invention relates generally to computer systems, and deals more particularly with a technique to determine if changes have been made to data during transmission, either through error or malicious activity.

It is well known today to transmit data across a network such as the Internet or any other, internal or external TCP/IP network. Various protocols such as File Transfer Protocol ("FTP") and Hyper-Text Transfer Protocol ("HTTP") can be used for the transmission. Typically, before the data is sent, the sender and receiver establish a communication session. Typically, the data is sent in a single connection, i.e. one or more requests and one or more respective responses through the same socket of both participants. However, in other environments, to speed the data transfer, the data is sent in multiple, asynchronous connections some of which are concurrent with each other. These multiple, asynchronous connections can be in the same or different session as each other and the original session. See allowed U.S. patent application entitled "Internet Backbone Bandwidth Enhancement" Ser. No. 09/644,494 filed Aug. 23, 2000 by Bauman, Escamilla and Miller, which patent application is hereby incorporated by reference as part of the present disclosure. The multiple connection mode requires a multithreaded function which can manage and coordinate the multiple connections in parallel. An IBM Download Director program currently transfers data across multiple connections in parallel using Download Director Protocol ("DDP"). The IBM Download Director program begins operation by defining a session which includes all the connections needed to authenticate the client and server to each other and transfer a file in separate segments. The IBM Download Director program is also capable of resuming a file transfer which has been terminated, so that the transmission is restarted at the point in the transfer where it terminated. The IBM Download Director program uses encryption for the transmitted files.

"Public/private" key encryption such as RSA is also well known. The public key (i.e. publicly known key) is used by the sender to encrypt data, and a private key known only to the recipient is used to decrypt the data which was encrypted with the public key. Thus, for each public key, the recipient has a corresponding private key used to decrypt the communication encrypted with the public key.

Symmetric encryption such as AES is also well known. With symmetric encryption, the same key is used for both encryption and decryption, and is kept secret by both the sender and recipient. Typically, the key is randomly generated by the sender or recipient, and sent to the other ahead of the communication. For security, the symmetric key can be sent encrypted using a public/private key encryption.

Neither FTP nor HTTP provides integrity checking or file protection through encryption. However, encryption has been added to both FTP and HTTP by encapsulation of the FTP files and HTTP files with a known Secure Sockets Layer ("SSL"). SSL is an encryption protocol. The secure FTP (called "FTPS") is not yet standardized. According to FTPS, integrity checking and file protection are performed by encrypting the file data. The secure HTTP (called "HTTPS") uses certificates to authenticate the server to the client and can also use certificates to authenticate the client to the server. HTTPS uses public/private key encryption during a handshake phase (which includes the sending of a symmetric key encrypted with a public key). HTTPS guarantees file integrity by symmetric key encryption of the entire data stream and message authentication codes ("MAC"). The MAC includes a hash of the transfer data, a sequence number, and other descriptors used in the protocol to identify the content and operations such as compression and encryption. The MAC however does not include a file name, file creation data or file size. In HTTPS, there is a hash of each block of data; a file is transmitted as one or more blocks. However, HTTPS does not have a high-performance capability (such as that of IBM Download Director Program) because it cannot manage multiple simultaneous connections. In other words, in HTTPS, all the requests and responses of one session proceed through the same connection.

An existing IBM Lotus Notes program encrypts data during transfer. Lotus Notes uses a S/MIME protocol to send encrypted messages. S/MIME protocol is a mail protocol that includes both a hash value and encrypted data, but does not include a session ID. S/MIME is intended for content delivery and is used as an asynchronous process. The sender identifies the recipient or recipient(s), and data encryption and hash values are created. The delivery can be at that time or at a later time. Transfer of the data is over a single connection and the content is not used in the transfer protocol.

"Hashing" is also well known today. Hashing is a process analogous to parity checking or cyclical redundancy checking where a function is performed on a set of bits or bytes to yield a unique "hash" value. Different algorithms can be used for hashing, such as SHA-1 and MD5. Two identical files will yield the same hash value (if they use the same hashing algorithm), and a difference in hash values indicates a difference between the two files. For example, U.S. Pat. No. 6,393,438 discloses a method and apparatus for identifying differences between two files, such as two versions of a Microsoft Windows registry file. Portions of the file are hashed to yield one four byte value per portion to provide a set of hash results. The set of hash results are combined with a four byte size of the portion of the file from which the hash was generated to produce a signature of each file. If the two files are different versions of a Windows registry file, the hash signatures of the two files will likely be different. It is also well known to hash data before transmission, hash the received data, and compare the two hash values to determine if any changes occurred to the data during transmission.

An object of the present invention is to expeditiously transfer data and reveal any changes that occur to the data in transit.

A more specific object of the present invention is to apply the foregoing technique to data transmitted during multiple connections in the same session.

SUMMARY OF THE INVENTION

The invention resides in a method for transferring data between a first computer and a second computer. The first computer sends a first request to the second computer in a first connection. The first request includes a request to start a session, an encrypted ID of the session, and an encrypted hash value for information in the first request. The information in the first request comprises the request to start the session and the encrypted session ID. The second computer receives the first request, and as a result, decrypts the encrypted hash value in the first request, independently determines a hash value for the information in the first request and compares the independently determined hash value to the decrypted hash value. If there is match, the second computer starts a session with the first computer. Subsequently, the first computer sends a second request to the second computer in a second connection in the session. The second request includes a request to download or upload data of a file, an encrypted ID of the session, an identity of the file to at least partially upload or download, and an encrypted hash value for information in the second request. The information in the second request comprises the request to download or upload data, the encrypted session ID and the file identity. The second computer receives the second request in the session, and as a result, decrypts the encrypted hash value in the second request, independently determines a hash value for the information in the second request and compares the independently determined hash value to the decrypted hash value. If there is match, the second computer processes the request to at least partially download or upload the file.

According to a feature of the present invention, the first request also includes a hash value for a file to upload, and the second request is to upload the file or a portion of the file and contains the file or file portion. After the file is completely received, either in one or multiple transfers, the second computer independently determines a hash value for the file and compares the independently determined hash value to the hash value sent by the first computer for the file. If they match, the second computer processes the file.

According to another feature of the present invention, the second request is to download a portion or all of the file. The second computer processes the second request by responding to the first computer with a response comprising the requested portion or all of the file, information about the requested portion or all of the file and an encrypted hash value for the information. The information comprises a name of the file and/or file portion. The first computer receives the response from the second computer, and as a result, decrypts the encrypted hash value in the response from the second computer, independently determines a hash value for the information in the response from the second computer and compares the independently determined hash value to the decrypted hash value in the response from the second computer. If there is match, the first computer processes the requested portion or all of the file.

DETAILED DESCRIPTION OF THE PREFERRED EMBODIMENTS

Figure 1:
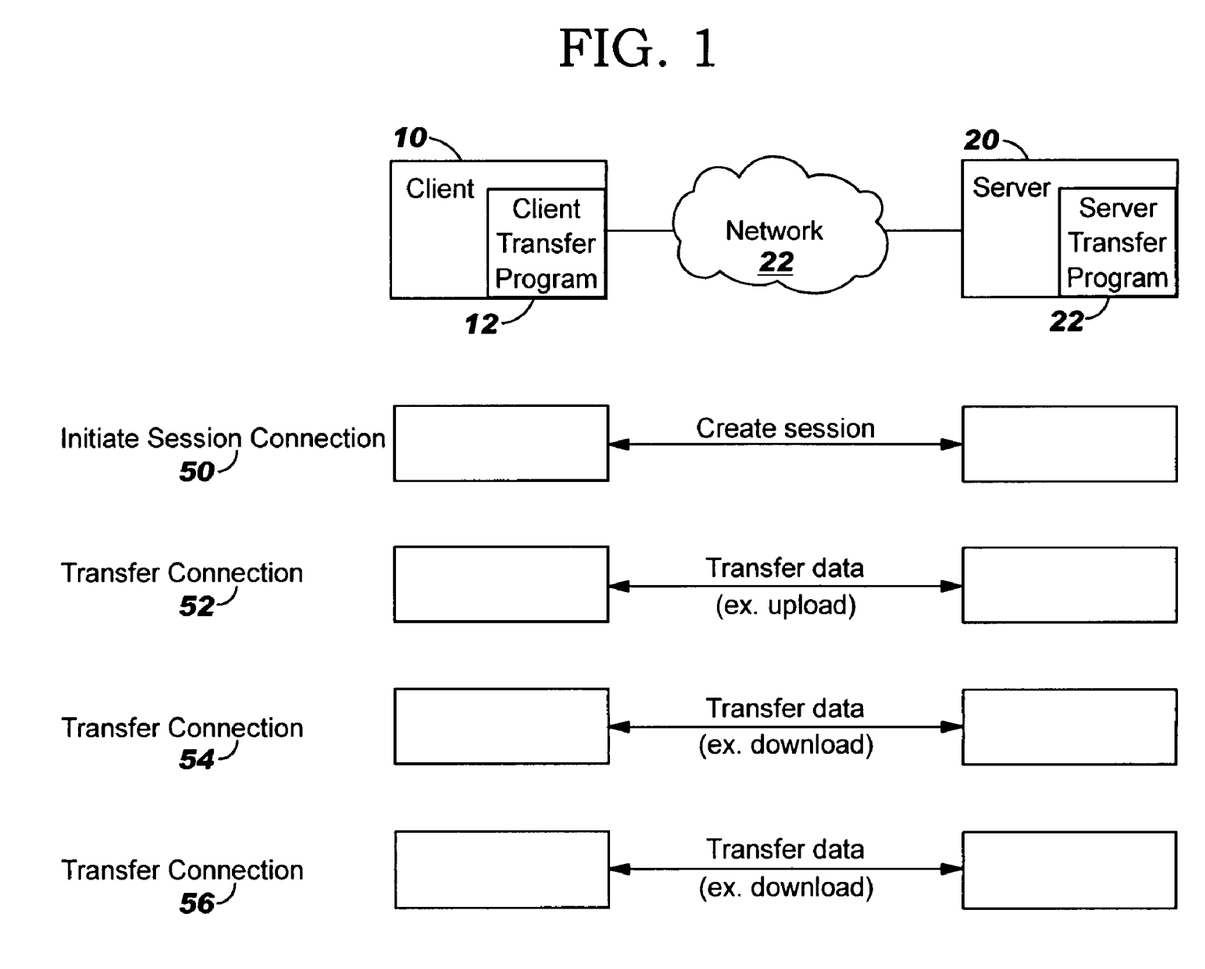
FIG. 1 is a block diagram of a client and server which implement the present invention, and communications between the client and server.

The present invention will now be described in detail with reference to the figures. FIG. 1 illustrates a client 10, a server 20 and a network 22 for communication there between. By way of example, the network 22 can be the Internet, any other, internal or external TCP/IP network, or other types of networks as well. In accordance with the present invention, FIG. 1 illustrates four "connections" between the client and the server, all made in the same "session". An initial connection 50 is for a request from the client to the server to establish the session and a response from the server indicating whether the session was successfully established. A subsequent connection 52 is for a request from the client to the server to upload data and a response from the server whether the data was successfully received. A subsequent connection 54 is for a request from the client to the server to download data and a response from the server which includes the data to be downloaded. A subsequent connection 56 is for another request from the client to the server to download data and a response from the server which includes the data to be downloaded. In the illustrated embodiment, connections 54 and 56 are used to download two segments of the same file. While not shown, there can be many more connections for the same session, for example, to transfer a lengthy file in multiple segments, one segment per connection. The multiple connections can be concurrent and asynchronous. Because of the multiple connections for uploading or downloading a single file and the associated management of these multiple connections as described below, the transfer will be expeditious. Also, if a connection fails, the file transfer can be resumed in a different connection in the same session without having to retransmit the portions of the file that were already successfully transmitted. Furthermore, if the session is interrupted by a catastrophic event such as the network failing, all successful segments will be maintained so that when a new session is created at a later date, the new session will only transfer the remaining segments.

In the illustrated embodiment, each of the requests and responses from the client 10 and the server 20 contains a header and meta data. The header includes prior art IP destination address or destination host name and other information such as found in a prior art HTTP header. The meta data includes a parameter indicating the nature of the request, for example, to start a session, download or upload data. The meta data for a request also specifies an encrypted session identifier ("ID"). In the illustrated embodiment, the meta data for a response does not specify the session ID, because it is made in the same connection as the request. Therefore the connection for the response is assumed to be the same as the connection for the request. The meta data for both a request and a response also describes features of the file data being or to be transferred such as file name, file size, file creation date, and a file data hash value. Each request and response also includes an encrypted meta data hash value. The client and server encrypt and decrypt the meta data hash value in messages from the other using a symmetric cypher. As described in more detail below, encryption of the meta data hash value is used to reveal changes to the meta data that occur during transmission. (In symmetric ciphering, an encryption key is supplied to the encryption function, and this one key is used for both encryption and decryption. Symmetric ciphering is also used for a user ID and password exchange.) For file data upload requests, the request also includes the actual file data. The actual file data can be encrypted if confidential. For data download responses, the response also includes the actual file data. The actual file data can be encrypted if confidential. Where encryption of the file data is needed, the encryption of the file data can be based on the symmetric cypher used for the session key or some other key or encryption method. The present invention is implemented at the client computer 10 by a client transfer program 12, and implemented at the server computer 20 by a server transfer program 22.

The following describes the general flow of requests and response according to one embodiment of the present invention. The client identifies a new session by a randomly generated session ID. The client then encrypts the session ID with the server's public key (acquired by the client during an earlier exchange or otherwise pre-determined)), and then sends the encrypted session ID to the server in an initial connection to create the session. If the client expects to make a subsequent file upload request, the client also furnishes a name, file size, and hash value for the entire file to be uploaded. If the client expects to make a subsequent download request, the client also furnishes a name of the file to be downloaded. When the server receives the encrypted session ID from the client and decrypts the session ID using the server's private key, the server then has the key for a symmetric cipher function. The server then initializes a symmetric cypher using the decrypted session ID as the decryption key for the symmetric cyphering. Then, the server can validate the meta data from the client by decrypting the hash value sent by the client for the meta data, independently calculating the hash value of the meta data in the request, and comparing the two hash values for the meta data. If they differ, this reveals that changes were made to the meta data sent from the client. If they are the same, then the meta data was received unchanged at the server. In response to the client request, the server generates in the same connection its own responsive communication indicating whether the session was established. This response includes meta data and an encrypted meta data hash value. The server also encrypts the meta data hash using the symmetric cypher. If the client's request specified a name of a file stored at the server, server includes in its response a file size and hash value for the entire file data. The client validates the server's meta data by independently calculating the hash value of the server's meta data and comparing it to the hash value received from the server after decryption by the client. This reveals if any changes occurred to the meta data during transmission.

Subsequent upload and download requests (in different connections) are made in the same session as created above, and include the same session ID (encrypted) and an encrypted meta data hash value. A file upload request includes a segment of the file when long, or the entire file when short. A server response includes an encrypted meta data hash value (and in the case of a download request, a file segment when the file is long or the entire file when the file is short). After the entire file is received by the server (in multiple connections) in the case of an upload request, the server independently generates a hash value for the complete file and compares it to the hash value sent by the client during session establishment to determine if any changes were made to the file. After the entire file is received by the client (in multiple connections) in the case of a download request, the client independently generates a hash value for the file and compares it to the hash value sent by the server during the session establishment to determine if any changes were made to the file. For both uploads and downloads, the hash value check for the complete file will reveal any changes in file data during transmission even when the file transmission is split between multiple connections. (The split can occur purposely when the file is long or inadvertently when a file transfer connection is terminated due to a failure or other reason and then the file transfer is resumed in another connection.) If a change in transmission has occurred, the recipient can discard the data and request retransmission.

Figure 2:
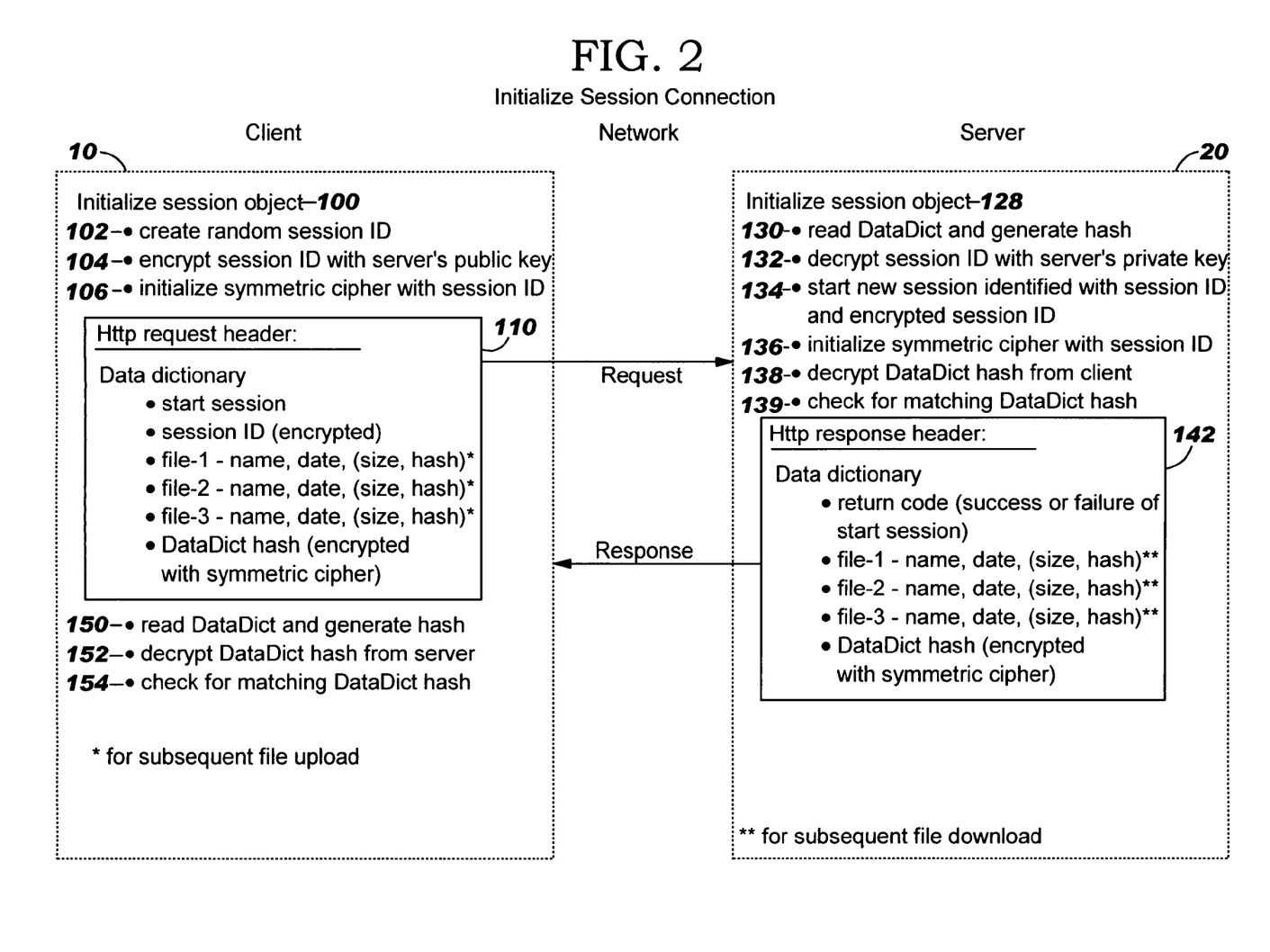
FIG. 2 is a flow chart illustrating the steps involved in establishing a session between the client and server of FIG. 1.

The present invention will now be described in more detail with reference to FIGS. 2-5. FIG. 2 illustrates the establishment of the session between the client 10 and server 20 according to the present invention. To initiate a new session, the client transfer program 12 initializes a new session object (step 100). The session object contains the session ID, an indication that the session is not yet active, the identity or IP address of the server or its socket to which connection is made, and a field to track the file upload progress in the case of a subsequent upload. Then, the client transfer program creates a random session ID (step 102). Then, the client transfer program encrypts the session ID with a public key previously obtained (step 104). The encryption of the session ID can use a known RSA algorithm or other known encryption algorithm. Then, the client transfer program initializes a symmetric cipher (to encrypt a meta data hash value) with the unencrypted session ID serving as the key for the symmetric ciphering (step 106). Examples of known symmetric ciphering functions are RC4 and AES.

Next, the client transfer program 12 creates the actual request 110 to send to the server. In the illustrated embodiment, this request is in HTTP form. The request includes an HTTP header, meta data and an encrypted hash value for the meta data. The HTTP request header from the client specifies the server name and port to receive the client request. The meta data comprises a request to start a session, the encrypted session ID, and for each file to subsequently upload a file name, file creation date, file size and file data hash, and for each file to subsequently download a file name. (An application that called the client transfer program 12 to initiate the data transfer previously specified the file(s) to download or upload. The client transfer program 12 calculated the hash value for each complete file data to upload.) The request also includes a meta data hash value encrypted with the symmetric cipher. The client transfer program 12 determined the meta data hash value for the foregoing meta data based on the SHA-1, MD5 or other known hashing algorithm. In the illustrated embodiment, the initial request to create the session does not include the actual file data to upload.

In response to the start session request, the server transfer program 22 creates a session object (step 126). Then, the server transfer program 22 reads the meta data and independently generates a hash value for the meta data using the SHA-1, MD5 or other algorithm used by the client transfer program 12 (step 130). Next, the server transfer program 22 decrypts the session ID supplied with the client request, using the server's private key (step 132). The decryption is based on the same algorithm used by the client transfer program 12 in the encryption. Next, the server starts (on its side) a session with the client identified by the decrypted and encrypted session ID (step 134). To start this session on the server side, the server transfer program 22 fills-in the session object with the session ID, an indication that the session is currently active and the identity or IP address of the client or its socket to which is made. The server transfer program 22 also creates a field to track the file upload progress in the case of a subsequent upload. Next, the server transfer program 22 initializes a symmetric cipher function with the decrypted session ID serving as the decryption key (step 136), and decrypts the meta data hash value supplied in the client request using the symmetric cipher function (step 138). Then, the server transfer program 22 compares its independently calculated hash value to the decrypted hash value to determine if the client is authentic and the meta data was received without change (step 139). If the meta data hash value calculated by the server matches the meta data hash value supplied by the client, the client is authentic, the meta data was received without change and server transfer program 22 prepares a response 142 to send to the client 10.

The response 142 includes a header, meta data and a meta data hash value. In the illustrated embodiment, the response is in HTTP form. The HTTP response header from the server specifies the content type and length (which header parameters are needed to support HTTP proxies, but are ignored by the client). The meta data comprises a return code indicating whether the session was successfully started. For each file to subsequently upload, the meta data in the client start request includes a file name, file size, file creation date, file creation date and a file data hash value. In the case of an upload, the server transfer program 22 will assume the file meta data supplied in the client request is accurate, and update its records accordingly. For each file to subsequently download, the meta data in the client start request includes a file name, file creation date, file size and file data hash. The server transfer program 22 calculates the hash value for the complete file data to subsequently download. The file names and file creation dates in the server's response were referenced in the client request to start the session. In the case of a download request, if the server transfer program 22 cannot locate the file, the server will indicate such for this file. If any of the file meta data found by the server transfer program 22 is different than that specified by the client transfer program 12 in the client session start request, the server will return the file meta data as the server finds it, and the client will update its records accordingly. The server transfer program 22 determines a hash value for the meta data and encrypts the hash value with the symmetric cipher. Next, the server 20 sends the response to the client 10.

Next, the client transfer program 12 receives and processes the response from the server as follows. The client transfer program 12 reads the meta data and independently calculates a hash value using the SHA-1, MD5 or other algorithm used by the server transfer program 22 (step 150). Then, the client transfer program 12 decrypts, using the symmetrical cypher, the meta data hash value supplied with the request (step 152), and compares its independently calculated meta data hash value to the decrypted meta data hash value (step 154). If they match, then the response is considered valid, and the client transfer program 12 has confirmed that the server is authentic and that the session has begun with the server. Also, in the case of a download request, the client transfer program 12 now knows the complete and correct file meta data. The client then records that the session with the server has officially begun by making an entry in its session object.

Next, the client transfer program 12 can use the same session (established in FIG. 2) to create requests to upload or download file data (in other connections). As explained below, the same session ID will be used, a hash will be created for the meta data, the hash value will be encrypted before being sent, and a comparison of the hash value which is sent to the hash value independently generated by the recipient will indicate whether the communication has been changed during transmission.

Figure 3:
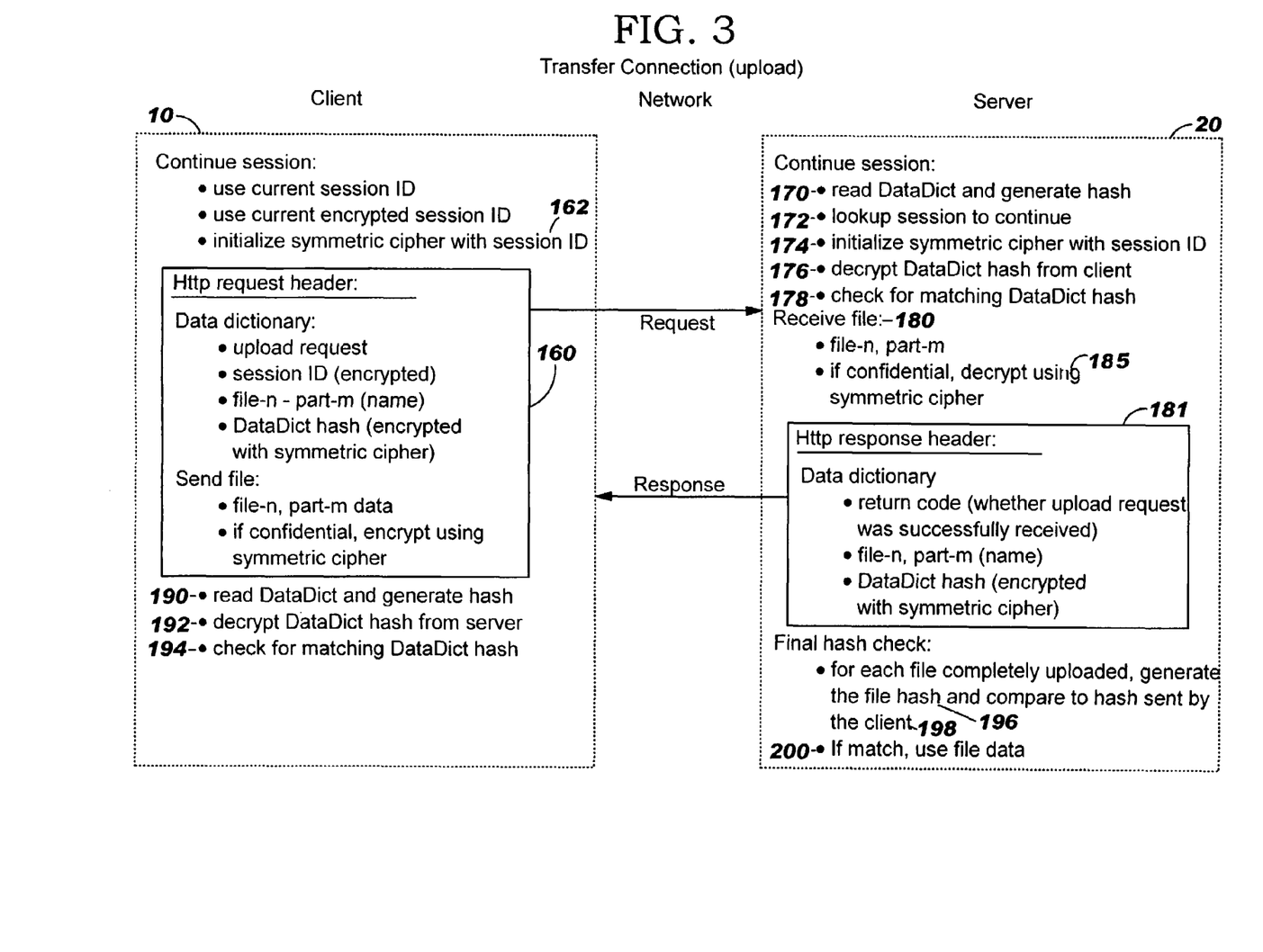
FIG. 3 is a flow chart illustrating the steps involved in uploading data from the client to the server of FIG. 1 in the session established in FIG. 2.

FIG. 3 illustrates an upload request 160 by the client transfer program 12 and the response 181 by the server transfer program 22, both in a subsequent connection in the same session as created in FIG. 2. The client transfer program 12 initializes the symmetric cypher for the meta data hash, using the session ID as the encryption key (step 162). In the illustrated embodiment, the upload request 160 comprises an HTTP request header, meta data, an encrypted meta data hash value, and a "send" file. The meta data comprises an upload request, the encrypted session ID and the name of the file or file segment to be uploaded. If this request pertains to a file segment (instead of an entire file) such as to upload a segment of a file from the client to the server, the meta data also includes a file start/stop parameter which indicates where the file segment begins and ends within the file. The meta data hash value was calculated using the SHA-1, MD5 or other algorithm. The meta data hash value was encrypted using the symmetric cipher. The "send" file contains the actual data in the file or file segment to be uploaded to the server. If the file data is sensitive, the client transfer program 12 can encrypt the file data using a symmetric cipher and send the encrypted file data instead of the unencrypted file data. In one embodiment of the present invention, the same cipher function with the same encryption key (i.e. the session ID) is used to encrypt the file data. However, in other embodiments of the present invention, a different cipher algorithm and/or a different cipher key can be used to encrypt the file data. Next, the client transfer program 12 sends the HTTP request 160 to the server 20.

Upon receipt of the HTTP upload request 160 from the client, the server transfer program 22 reads the meta data and independently generates a corresponding hash value using the SHA-1, MD5 or other algorithm corresponding to that used by the client transfer program 12 (step 170). Then, the server transfer program 22 reads the encrypted session ID from the client transfer program 12 request, and checks if this (encrypted) session ID was previously recorded by the server in a session object, and is an active session (step 172). If so, the server transfer program 22 initializes the symmetric cipher for this encrypted session ID using the session ID as the key (step 174), and decrypts the encrypted meta data hash supplied by the client, using this symmetric cipher (step 176). Next, the server transfer program 22 compares the meta data hash value that it independently calculated to the decrypted meta data hash supplied by the client (step 178). If they match, then the server accepts the file data or file segment data supplied in the client upload request (step 180). If the file data or file segment data supplied in the client upload request was encrypted by the client, then the server transfer program 22 decrypts it using the same cipher as used to encrypt the file data (step 185).

Next, the server transfer program 22 prepares the response 181 to the client. The response includes an HTTP header, meta data and an encrypted meta data hash value. The meta data comprises a return code indicating whether the upload request was successful and the name of the file or file segment that was successfully received. If the server response 181 pertains to a file segment (instead of an entire file), the meta data also includes a file start/stop parameter which indicates where in the file the file segment begins and ends. The hash value is encrypted using the symmetric cipher. Next, the server transfer program 22 sends the HTTP response to the client.

Upon receipt of the HTTP response, the client transfer program 12 reads the meta data and independently calculates a corresponding hash value using the SHA-1, MD5 or other algorithm (step 190). Then, the client transfer program 12 decrypts the meta data hash value supplied in the server's HTTP response using the symmetric cypher (step 192), and compares the server supplied hash value to the one independently calculated by the client transfer program 12 (step 194). If the two hash values are the same, this authenticates the server to the client, and the client learns that the server successfully (or unsuccessfully) received the file data contained in the client's previous HTTP upload request. If the two hash values do not match, the client will re-send the file data in another HTTP upload request.

As explained above, if a file is lengthy, multiple HTTP upload requests may be required to transfer the complete file from the client to the server. In the illustrated embodiment, each pair of upload request and response are made in a separate connection, but all the upload requests and responses for this file are made in the same session as created in FIG. 2. So, the foregoing steps 162-194 are repeated for each additional upload request and response. FIG. 3 illustrates additional processing performed by the server 20 after it has received all the data of a file (when the file data is sent in either one upload request or in multiple upload requests in segments in multiple, respective connections). Server transfer program 22 independently calculates a hash value using the SHA-1, MD5 or other algorithm for all the data in the file (step 196). Then, server transfer program 22 compares its independently calculated hash value to the hash value supplied by the client 10 in the initial HTTP request to create the session (step 198). If the two hash values are the same, then the file data was transferred from the client to the server without change and is considered valid by the server. Consequently, the server can then use the data (step 200).

Figure 4:
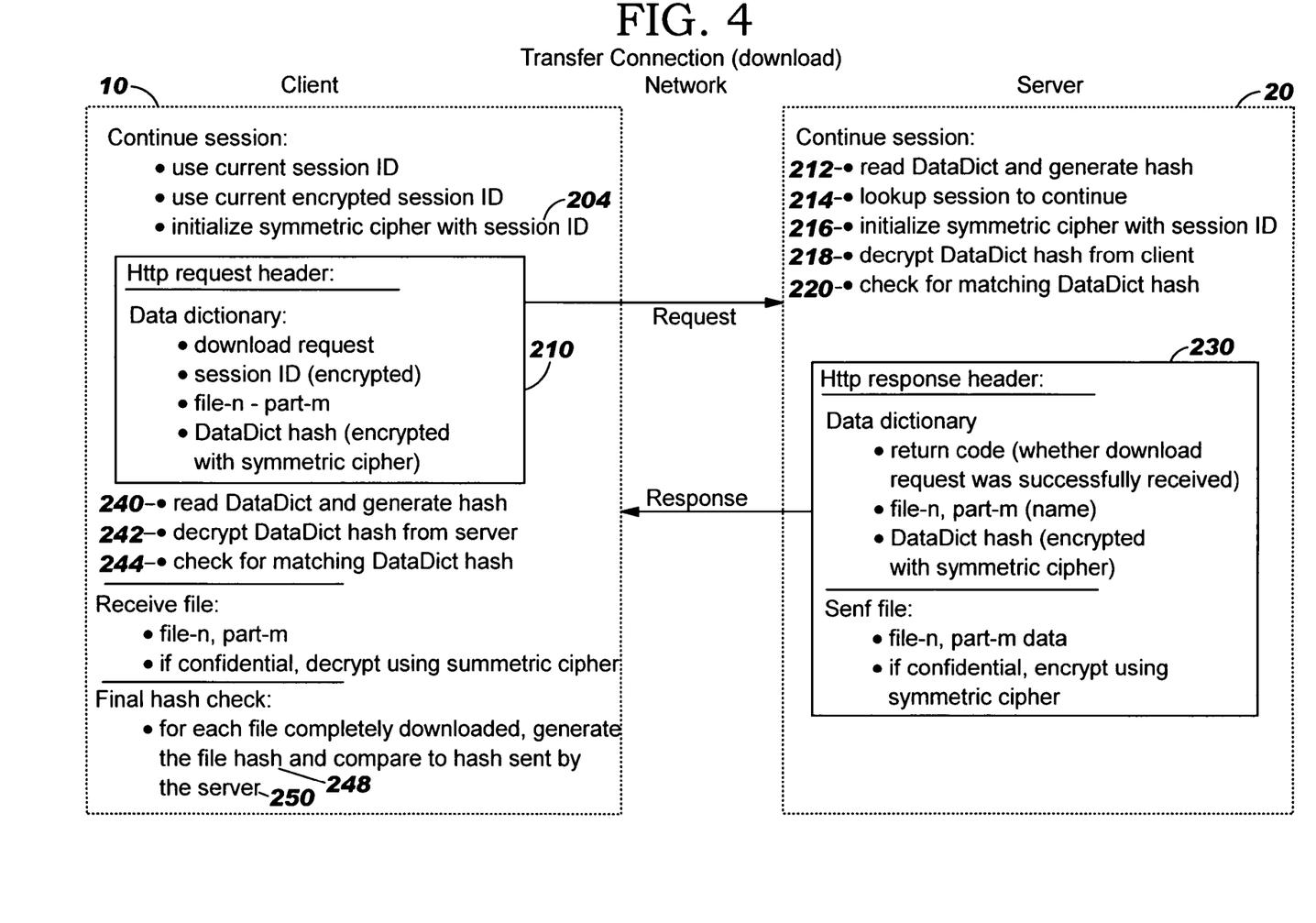
FIG. 4 is a flow chart illustrating the steps involved in downloading data from the server to the client of FIG. 1 in the session established in FIG. 2.

FIG. 4 illustrates the steps involved in the client making a download request 210 to the server, and the server responding to the download request. Both the download request 210 and the response 230 are made in a new connection but the same session initiated in FIG. 2. The download request will use the same session ID, encrypted using the server's public key. The client transfer program 12 will initialize a symmetric cipher with the session ID to encrypt the meta data hash (step 204). The client's download request 210 comprises an HTTP request header, meta data and an encrypted meta data hash value. The meta data comprises a download request, the encrypted session ID, and the name of the file or file segment ("part-m") to be downloaded. The meta data hash is encrypted with the symmetric cipher. Then, the client sends the HTTP request to the server. In response, the server transfer program 22 reads the meta data from the client request and independently generates a corresponding hash value using the SHA-1, MD5 or other algorithm used by the client (step 212). Then, the server transfer program 22 checks from its records whether the session ID is valid and whether this session is currently active (step 214). If so, the server transfer program 22 initializes a symmetric cipher with this session ID (step 216) to decrypt the meta data hash value contained in the client download request (step 218). Next, the server transfer program 22 compares the decrypted meta data hash value to the meta data hash value independently generated by the server transfer program 22 (step 220). If they match, the server transfer program 22 will process/respond to the request as follows. The server transfer program 22 will fetch the requested file data or file segment data from memory or storage, and then prepare the HTTP response 230. The HTTP response comprises an HTTP response header, meta data, and the requested "receive" file data. The meta data comprises a return code indicating whether the download request was successfully received, the name of the file data or file segment data that is being downloaded and an encrypted hash value for the meta data. The send file contains the actual file data or file segment data that was requested. If the data is confidential or otherwise sensitive, the server transfer program 22 can encrypt the file data or file segment data and send the encrypted form to the client instead of the unencrypted form. The encryption can use the same symmetric cipher with the same encryption key as used for the meta data hash, or a different symmetric cipher and/or a different encryption key. Next, the server transfer program 22 sends the HTTP response to the client.

Upon receipt of the HTTP response, the client transfer program 12 reads the meta data and independently generates a corresponding hash value using the SHA-1, MD5 or other algorithm used by the server (step 240). Then, the client transfer program 12 decrypts the meta data hash value from the server's HTTP response (step 242), and compares the two meta data hash values (step 244). If they are the same, then the server is authentic and the client receives the actual file data or file segment data from the server HTTP response. If the file data or file segment data was encrypted, then the client transfer program 12 decrypts the file data or file segment data using the same cipher as used by the server transfer program 22. As noted above, it may require multiple download requests/responses to download a lengthy file, or the entire file may be downloaded in a single request/response if the file is short. For each file completely downloaded by the client in one or more server HTTP responses, the client transfer program 12 generates a hash value for the complete file (step 248), and compares it to the corresponding hash value supplied in the server's HTTP response to the start session request (step 250). If the two hash values match, then the client can use the data. If the two hash values do not match, then the client will discard all the file data, and begin again the foregoing process of requesting the file data.

Based on the foregoing, a system, method and program product for revealing errors or other changes in transmissions have been disclosed. However, numerous modifications and substitutions can be made without deviating from the scope of the present invention. For example, other encryption algorithms or hash algorithms than those mentioned can be substituted. In another example, the HTTP request header and HTTP response header can be eliminated without changing the object of the invention. The use of these headers simply enables this invention to be implemented under a "standard" protocol. Therefore, the present invention has been disclosed by way of illustration and not limitation, and reference should be made to the following claims to determine the scope of the present invention.

The invention claimed is:

1. A method for transferring data between a first computer and a second computer, said method comprising the steps of:
said first computer sending a first request to said second computer in a first connection, said first request including a request to start a session, an encrypted ID of said session, and an encrypted hash value for information in said first request, said information in said first request comprising said request to start said session and said encrypted session ID;
said second computer receiving said first request, and in response, decrypting said encrypted hash value in said first request, independently determining a hash value for said information in said first request and comparing the independently determined hash value to the decrypted hash value, and if there is match, starting a session with said first computer;
subsequently, said first computer sending a second request to said second computer in a second connection in said session, said second request including a request to download or upload data of a file, said encrypted ID of said session, an identity of said file to at least partially upload or download, and an encrypted hash value for information in said second request, said information in said second request comprising said request to download or upload data, said encrypted session ID and said file identity; and
said second computer receiving said second request in said session, and in response, decrypting said encrypted hash value in said second request, independently determining a hash value for said information in said second request and comparing the independently determined hash value to the decrypted hash value, and if there is match, processing said request to at least partially download or upload said file.

2. A method as set forth in claim 1 wherein said information in said first request also comprises said identity of said file to at least partially download or upload in said second connection in said session.

3. A method as set forth in claim 2 wherein said file identified in said first request is a file to at least partially upload, and said information in said first request also comprises a hash value for said file.

4. A method as set forth in claim 1 wherein said first request also includes a hash value for a file to upload, and said second request is to upload a first segment of said file; and further comprising the steps of:

subsequently, said first computer sending a third request to said second computer in a third connection, said third request including a request to upload another segment of said file in said session, said encrypted ID of said session, an identity of said other segment of said file, and an encrypted hash value for information in said third request, said information in said third request comprising said request to upload said other segment of said file, said encrypted session ID, and said identity of said file;

said second computer receiving said third request in said session, and in response, decrypting said encrypted hash value in said third request, independently determining a hash value for said information in said third request and comparing the independently determined hash value to the decrypted hash value, and if there is match, processing said third request to upload said other file segment; and if said other segment completes the upload of said file, said second computer independently determining a hash value for said file and comparing said independently determined hash value to the hash value sent by said first computer for said file, and if they match, processing said file.

5. A method as set forth in claim 1 wherein said first request also includes a hash value for a file to upload, and said second request is to upload said file and contains said file; and further comprising the steps of:

said second computer independently determining a hash value for said file and comparing said independently determined hash value to the hash value sent by said first computer for said file, and if they match, processing said file.

6. A method as set forth in claim 1 wherein said second request is to download a portion or all of said file, and wherein said second computer processes said second request by responding to said first computer with a response comprising the requested portion or all of said file, information about the requested portion or all of said file and an encrypted hash value for said information, said information comprising a name of said file and/or file portion; and further comprising the steps of:

said first computer receiving said response from said second computer, and in response, decrypting said encrypted hash value in said response from said second computer, independently determining a hash value for said information in said response from said second computer and comparing the independently determined hash value to the decrypted hash value in said response from said second computer, and if there is match, processing the requested portion or all of said file.

7. A method as set forth in claim 1 wherein said second request is to upload said file or a first segment of said file and contains said file or first segment in encrypted form.

8. A method as set forth in claim 7 wherein said first request also includes a hash value for said file or first segment.

9. A method as set forth in claim 1 wherein the step of said second computer starting a session with said first computer comprises the step of said second computer sending a response to said first computer in said first connection, said response including an encrypted hash value for information in said response.

10. A method as set forth in claim 9 wherein said first computer, upon receiving said response from said second computer, decrypts said hash value for information in said response, independently determines a hash value for said information in said response, compares the decrypted hash value of said information in said response to the independently determined hash value of said information in said response, and if there is a match, confirms that said session has been established.

11. A system for transferring data between a first computer and a second computer, said system comprising:

said first computer including means for sending a first request to said second computer in a first connection, said first request including a request to start a session, an encrypted ID of said session, and an encrypted hash value for information in said first request, said information in said first request comprising said request to start said session and said encrypted session ID;

said second computer including means for receiving said first request, and in response, decrypting said encrypted hash value in said first request, independently determining a hash value for said information in said first request and comparing the independently determined hash value to the decrypted hash value, and if there is match, starting a session with said first computer;

said first computer including means for subsequently sending a second request to said second computer in a second connection in said session, said second request including a request to download or upload data of a file, said encrypted ID of said session, an identity of said file to at least partially upload or download, and an encrypted hash value for information in said second request, said information in said second request comprising said request to download or upload data, said encrypted session ID and said file identity; and said second computer including means for receiving said second request in said session, and in response, decrypting said encrypted hash value in said second request, independently determining a hash value for said information in said second request and comparing the independently determined hash value to the decrypted hash value, and if there is match, processing said request to at least partially download or upload said file.

12. A system as set forth in claim 11 wherein said information in said first request also comprises said identity of said file to at least partially download or upload in said second connection in said session.

13. A system as set forth in claim 12 wherein said file identified in said first request is a file to at least partially upload, and said information in said first request also comprises a hash value for said file.

14. A system as set forth in claim 11 wherein said first request also includes a hash value for a file to upload; said second request is to upload said file and contains said file; and said second computer includes means for independently determining a hash value for said file and comparing said independently determined hash value to the hash value sent by said first computer for said file, and if they match, processing said file.

15. A system as set forth in claim 11 wherein:

said second request is to download a portion or all of said file, and wherein said second computer processes said second request by responding to said first computer with a response comprising the requested portion or all of said file, information about the requested portion or all of said file and an encrypted hash value for said information, said information comprising a name of said file and/or file portion; and said first computer includes means for receiving said response from said second computer, and in response, decrypting said encrypted hash value in said response from said second computer, independently determining a hash value for said information in said response from said second computer and comparing the independently determined hash value to the decrypted hash value in said response from said second computer, and if there is match, processing the requested portion or all of said file.

16. A computer program product for transferring data between a first computer and a second computer, said computer program product comprising:

a computer readable medium;

first program instructions within said first computer to send a first request to said second computer in a first connection, said first request including a request to start a session, an encrypted ID of said session, and an encrypted hash value for information in said first request, said information in said first request comprising said request to start said session and said encrypted session ID;

second program instructions within said second computer to receive said first request, and in response, decrypt said encrypted hash value in said first request, independently determine a hash value for said information in said first request and compare the independently determined hash value to the decrypted hash value, and if there is match, start a session with said first computer;

third program instructions within said first computer to subsequently send a second request to said second computer in a second connection in said session, said second request including a request to download or upload data of a file, said encrypted ID of said session, an identity of said file to at least partially upload or download, and an encrypted hash value for information in said second request, said information in said second request comprising said request to download or upload data, said encrypted session ID and said file identity; and fourth program instructions within said second computer to receive said second request in said session, and in response, decrypt said encrypted hash value in said second request, independently determine a hash value for said information in said second request and compare the independently determined hash value to the decrypted hash value, and if there is match, process said request to at least partially download or upload said file; and wherein said first, second, third and fourth program instructions are recorded on said medium.

17. A computer program product as set forth in claim 16 wherein said information in said first request also comprises said identity of said file to at least partially download or upload in said second connection in said session.

18. A computer program product as set forth in claim 17 wherein said file identified in said first request is a file to at least partially upload, and said information in said first request also comprises a hash value for said file.

19. A computer program product as set forth in claim 16 wherein said first request also includes a hash value for a file to upload; said second request is to upload said file and contains said file; and further comprising fifth program instructions within said second computer to independently determine a hash value for said file and compare said independently determined hash value to the hash value sent by said first computer for said file, and if they match, process said file; and wherein said fifth program instructions are recorded on said medium.

20. A computer program product as set forth in claim 19 wherein:

said second request is to download a portion or all of said file, and wherein said fourth program instructions process said second request by responding to said first computer with a response comprising the requested portion or all of said file, information about the requested portion or all of said file and an encrypted hash value for said information, said information comprising a name of said file and/or file portion; and further comprising sixth program instructions within said first computer to receive said response from said second computer, and in response, decrypt said encrypted hash value in said response from said second computer, independently determine a hash value for said information in said response from said second computer and compare the independently determined hash value to the decrypted hash value in said response from said second computer, and if there is match, process the requested portion or all of said file; and wherein said sixth program instructions are recorded on said medium.

* * * * *